United States Patent Office 3,133,819
Patented May 19, 1964

3,133,819
NUTRITIONAL CONFECTIONERS' FATS
Chester M. Gooding, Westfield, N.J., assignor to Corn
Products Company, New York, N.Y., a corporation of
Delaware
No Drawing. Filed Nov. 16, 1960, Ser. No. 69,549
12 Claims. (Cl. 99—118)

This invention relates to novel confectioners' fats and to processes of producing the same. More particularly this invention relates to novel nutritious confectioners' fats having highly desirable physical characteristics and to processes for producing the same.

Confectioners' fats, also known as hard butters, are composed generally, at the present time, of the so-called lauric-type fats. These fats are eminently suitable for use in confectionery products since they possess a very short plastic range which is essential in a coating fat which must be non-greasy at ordinary temperatures and which must also melt in the mouth. In an effort to achieve the highest degree of brittleness and a minimum of greasiness at near-body temperatures, manufacturers of confectioners' fats have completely hydrogenated the lauric-type fats. In most cases it is necessary to still further increase the dryness of such fats by the addition of a small portion of saturated $C_{18}$-type fats usually by means of interesterification. Confectioners' fats may also be prepared by fractionation of the fats whereby the lower melting fatty acids or glycerides are removed. Confectionery fats, which are employed for special purposes, may have residual iodine values of 5 to 10 or even 15, the unsaturated acids comprising only oleic acid or some isomer of oleic acid resulting from an incomplete degree of hydrogenation. In no case is there any significant amount of linoleic or other polyunsaturated acid remaining in the confectioners' fat.

Linoleic acid and other polyunsaturated acids such as linolenic acid are recognized as being important nutrients. These acids are generally considered to be essential fatty acids which cannot be produced within the human body and which must be furnished in the diet. While the active metabolic form of the essential fatty acids in the human body is arachidonic acid, linoleic and linolenic acid are converted to arachidonic acid in vivo, the transformation being expedited by vitamin $B_6$. Thus any one of the three fatty acids mentioned can serve as a source of the essential fatty acids. From the practical standpoint, however, the only abundant and dependable dietary source is linoleic acid, found in rich supply in the liquid unhydrogenated domestic vegetable oils. Not only have the essential fatty acids been shown to be required as dietary components in every animal study, but they are also required for proper growth, reproduction, lactation, longevity, normal tissue structure, for control of normal plasma and liver cholesterol levels and for normal liver lipid levels.

In recent years the saturated fatty acids have been characterized as undesirable components because they lack essential fatty acid activity and promote an increase in the plasma cholesterol levels. It has generally been believed that the saturated fatty acids in a fatty food may be tolerated provided there is a substantial quantity of essential fatty acids present in that food; in other words the higher the ratio of essential fatty acids to saturated fatty acids in a food, the better is that food regarded for human consumption.

It is therefore an object of this invention to provide a confectioners' fat of improved nutritive value. It is another object of this invention to provide a process for producing confectioners' fat of improved nutritive value without serious impairment of the necessary physical characteristics of such fats. These and further objects will become apparent from the following detailed description.

Therefore according to this invention I have discovered that the incorporation of a relatively small amount of linoleic acid in a confectioners' fat greatly improves the nutritional value of the fat to such an extent that the confectioners' fats may be made fully equal to cocoa butter without adversely affecting the physical characteristics of the fat.

The novel confectioners' fats of this invention comprise at least one fat selected from the group consisting of lauric-type fats, $C_{18}$-type fats and mixtures thereof, and from about 2% to about 15% of natural linoleic acid, the natural linoleic acid being in glyceridic ester form in a fat in which the ratio of

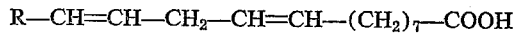

is about 2 or more. The fats of this invention have a Wiley melting point of about 90 to about 115° F., an iodine value of about 4 to about 32, and have an S.C.I. value at 50° F. of from about 50 to about 75, at 70° F. of from about 40 to 60, at 80° F. from about 30 to 50 at 92° F. of from about 5 to 25.

The lauric-type fats are generally composed of fats based upon coconut, babassu, palm kernel, cohune nut and other tropical fats. The saturated $C_{18}$-type fats are generally saturated vegetable oils such as cottonseed oil, soybean oil, peanut oil, etc.

The lauric-type fats and $C_{18}$-type fats employed in my novel fat composition have a Wiley melting point of less than about 115° F. and an iodine value of less than about 15.

The polyunsaturated acids of the linoleic series include only those acids having the following basic structure:

$$R—CH=CH—CH_2—CH=CH—(CH_2)_7—COOH$$

in which R is an unsubstituted radical containing non-conjugated and cis-unsaturation. These acids are found in rich supply in the limpid domestic vegetable oils such as cottonseed oil, safflower oil, corn oil, and in by-products extracted from such oils, such as cottonseed stearine. The L/S ratio, that is the ratio of the linoleic acids to saturated fatty acids of the fats of this invention is in the range of about 0.02 to about 0.2.

It is indeed remarkable that the incorporation of such a small amount of linoleic acid into conventional confectioners' fats converts the confectioners' fats from a type which is stressful in the diet to a type which possesses full nutritive value. This is all the more remarkable in view of the generally accepted belief that the L/S ratio must be in excess of 1.0, and the greater the excess, the better the nutritive value of the food. However, animal feeding tests clearly demonstrate the remarkable effect that the incorporation of a relatively minor amount of linoleic acid in a confectioners' fat has on the growth and survival of the animals. This is demonstrated most clearly in Table I below in which to a basal, fat-free diet was added 15% of each of the fats being studied.

TABLE I.—BREEDING AND GROWTH DATA

|  | Nutritive Confectioners' Fat | Cocoa Butter |
|---|---|---|
| Females bred | 15 | 15 |
| Number born per litter | 10.8 | 10.7 |
| Number surviving per litter at 3 days | 10.4 | 10.5 |
| Av. Weight at 21 days grams | 42.1 | 40.1 |
| Plasma Cholesterol (Males), mg. percent: |  |  |
| Free Cholesterol | 20.1±1.0 | 17.6±1.1 |
| Total Cholesterol | 60.7±1.7 | 56.7±2.8 |
| Liver Cholesterol (Males), mg. Chol./gm. Liver: |  |  |
| Free Cholesterol | 2.43±0.01 | 2.41±0.49 |
| Total Cholesterol | 2.80±0.3 | 3.01±0.10 |
| Percent Liver Wt./Body Wt | 2.6 | 2.9 |

It will be noted from this table that animals fed on a diet using the nutritive confectioners' fat of this invention as the sole source of dietary fat averaged more in weight than did animals fed on a cocoa butter diet. In other tests using saturated fats as the sole source of dietary fat, none of the animals survived the first three days of life.

The novel confectioners' fat of this invention may be prepared by a simple mixing of a commercial saturated hard butter of the lauric-type fats with a small amount of a fat rich in linoleic acid and which conforms to the formula ratio given above. The fat compositions may also be prepared by the interesterification of a saturated lauric-type fat with a fat conforming to the formula ratio above. For certain purposes, it may be advantageous to randomize the linoleic-containing fat when such randomization by means of catalytic rearrangement results in an increased melting point as compared with the same fat prior to randomization. Fats of this type are limited in number but include cottonseed oil and cottonseed stearine.

More detailed discussions on interesterification reactions may be found in Melnick et al., U.S. Patent No. 2,921,855 and in Gooding U.S. Patent No. 2,309,949, and these disclosures are incorporated herein by reference.

The following examples are illustrative of the invention and applicant intends to be bound only by the spirit and scope of the appended claims.

*Example 1*

75 parts of saturated palm kernel oil, 15 parts of saturated cottonseed stearine and 15 parts of cottonseed stearine having an iodine value of 89 were randomly interesterified by known procedures. The product was refined and deodorized. This product is compared below with cocoa butter and a confectioners' fat of commercial composition prepared by rearranging a mixture of 94 parts of saturated palm kernel and 6 parts of saturated cottonseed stearine in the same manner as above.

|  | Nutritive Confectioners' Fat | Commercial Hard Butter | Cocoa Butter |
|---|---|---|---|
| Wiley M.P. | 101.6 | 102.2 | 81.1 |
| Setting Point | 33.5 | 33.4 | 23.3 |
| Iodine Value | 14.8 | 1.0 | 18.6 |
| Solids Content Index: |  |  |  |
| 50° | 60.3 | 68.3 | 81.0 |
| 70° | 47.9 | 57.1 | 76.8 |
| 80° | 37.9 | 44.6 | 7.2 |
| 92° | 15.7 | 15.2 | 1.9 |
| 102° | 2.1 | 1.6 | none |
| Percent Fatty Acids in the Triglycerides: |  |  |  |
| Linoleic | 6.2 | 0.0 | 3.5 |
| Oleic | 3.9 | 1.0 | 35.9 |
| Saturated | 85.4 | 94.5 | 56.2 |

It will be noted from the above data that the confectioners' fat of this example contains almost twice as much linoleic acid as cocoa butter.

*Example 2*

A nutritive confectioners' fat is prepared by first interesterifying a saturated lauric-type fat and a small amount of a saturated $C_{18}$-type fat. This is accomplished by interesterifying 90 parts of saturated palm kernel fat with 10 parts of saturated cottonseed stearine. Whole cottonseed stearine is separately rearranged. 80 parts of the rearranged saturated palm kernel fat and saturated stearine product is blended with 20 parts of rearranged cottonseed stearine. The properties of these compositions are set forth below.

|  | Wiley M.P. | Iodine Value | S.C.I. | | | | |
|---|---|---|---|---|---|---|---|
|  |  |  | 50° | 70° | 80° | 92° | 102° |
| A. Rearranged, Saturated Palm Kernel Cottonseed Stearine | 98.6 | 0.8 | 67.2 | 56.4 | 45.3 | 15.8 | 0.0 |
| B. Cottonseed Stearine | 87.5 | 85.8 | 34.1 | 2.3 | 1.1 | 0.0 | 0.0 |
| C. Rearranged Cottonseed Stearine | | | 24.4 | 13.7 | 11.2 | 11.5 | |
| D. 80 Parts (A) + 20 Parts (C) | 99.0 | 16.9 | 57.3 | 46.4 | 35.6 | 10.9 | 0.2 |

In this example cottonseed stearine is mixed with a previously interesteified mixture of a saturated lauric-type fat and a saturated $C_{18}$-type fat.

|  | Wiley M.P. | Iodine Value | S.C.I. | | | | |
|---|---|---|---|---|---|---|---|
|  |  |  | 50° | 70° | 80° | 92° | 102° |
| E. 80 Parts of A of Example 2+20 parts of B of Example 2 | 96.8 | 17.9 | 55.9 | 43.1 | 31.8 | 8.3 | 0.0 |

Having described various ways in which a fat containing linoleic acid may be employed to prepare a nutritive confectioners' fat, it will be obvious to any one skilled in the art that, if whole cottonseed oil were to be employed instead of the cottonseed stearine in the above examples, to achieve the same results, the substitution of cottonseed oil for cottonseed stearine would provide more linoleic acid and it may be desirable to increase the proportion of saturated C-18 type fat in the A-component of Example 2.

Conversely, less cottonseed oil would be employed in blend E if cottonseed oil is substituted for cottonseed stearine in order to incorporate the same amount of linoleic acid as provided by Example 3. This is because the cottonseed oil contains more linoleic acid than does cottonseed stearine although both conform to the formula ratio (linoleic/oleic) of at least about 2.0.

Furthermore, in employing safflower oil, for example, still less of the unsaturated oil would be needed to provide the same amounts of linoleic acid. Without varying the proportion of unsaturated fat in substituting safflower oil for cottonseed stearine in the above examples, one may provide a higher concentration of linoleic acid, although it may also be desirable to adjust the final melting point and solids content of the interesterified portion, e.g., blend A of Examples 2 and 3 by altering the ratio of saturated lauric fat and saturated C-18 type fat prior to their interesterification.

In employing safflower oil in Example 1, the composition may be altered as illustrated in the following example.

*Example 4*

56 parts of saturated coconut oil, 24 parts of saturated soya oil and 20 parts of safflower oil are interesterified to provide a confectioners' fat containing approximately 13% linoleic acid.

This application is a continuation-in-part application of my co-pending application Serial No. 52,351, filed August 29, 1960, now Patent No. 3,099,564.

Having thus provided a written description of the present invention and provided specific examples thereof, it should be understood that no undue restrictions or limitations are to be imposed by reason thereof but that the present invention is defined by the appended claims.

I claim:

1. A nutritious confectioners' fat consisting essentially of a fat blend comprising at least about 80% of an interesterified tropic fat having an iodine value of less than about 15, a melting point of less than about 115° F. and containing substantially no linoleic acid with the balance of said blend being an unrearranged vegetable oil having natural linoleic acid in glyceridic ester form in which the ratio of $$\frac{\text{Linoleic acid}+\text{polyunsaturated acid of the linoleic series}}{\text{Oleic acid}+\text{monounsaturated acids}}$$

is at least about 2, said confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to 60, at 80° F. of from about 30 to about 50, and at 92° F. of from about 5 to about 25, and having a ratio of linoleic acid to saturated acids of from about 0.02 to about 0.2.

2. A nutritious confectioners' fat consisting essentially of a blend of interesterified fats comprising at least about 80% of tropic fat having an iodine value of less than about 15, a melting point of less than about 115° F. and containing substantially no linoleic acid with the balance of said blend being a vegetable oil having natural linoleic acid in glyceridic ester form in which the ratio of $$\frac{\text{Linoleic acid}+\text{polyunsaturated acid of the linoleic series}}{\text{Oleic acid}+\text{monounsaturated acids}}$$

is at least about 2, said confectioners' fat containing about 2 to 15% of natural linoleic acid and having a melting point of from about 90° F. to about 115° F., an iodine value of from about 4 to about 32, S.C.I. values at 50° F. of from about 50 to 70, at 70° F. of from about 40 to about 60, at 80° F. of from about 30 to about 50, and at 92° F. of from about 5 to about 25, and having a ratio of linoleic acid to unsaturated acids of from about 0.02 to about 0.2.

3. A nutritious confectioners' fat consisting essentially of a blend of interesterified fats comprising about 55% to about 72% of a tropic fat having an iodine value of less than about 15, a melting point of less than about 115° F. and containing substantially no linoleic acid, about 10% to about 25% of a saturated vegetable oil with the balance of said blend being a vegetable oil having natural linoleic acid in glyceridic ester form in which the ratio of $$\frac{\text{Linoleic acid}+\text{polyunsaturated acid of the linoleic series}}{\text{Oleic acid}+\text{monounsaturated acids}}$$

is at least about 2, said confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to about 60, at 80° F. of from about 30 to about 50, and at 92° F. of from about 5 to about 25, and having a ratio of linoleic acid to saturated acids of from about 0.02 to about 0.2.

4. A nutritious confectioners' fat according to claim 3 wherein said tropic fat is selected from the group consisting of coconut oil, babassu oil, palm kernel oil and cohune nut oil.

5. A nutritious confectioners' fat according to claim 3 wherein said vegetable oil is selected from the group consisting of cottonseed oil, cottonseed stearine, soybean oil, corn oil and safflower oil.

6. A nutritious confectioners' fat according to claim 3 wherein said saturated vegetable oil is selected from the group consisting of saturated cottonseed oil, saturated corn oil, saturated soybean oil, saturated peanut oil, saturated cottonseed stearine oil and saturated safflower oil.

7. A nutritious confectioners' fat consisting essentially of a fat blend comprising at least about 80% of an interesterified fat which comprises at least about 55% of a tropic fat having an iodine value of less than about 15 and a melting point of less than about 115° F. and containing substantially no linoleic acid and at least about 10% of a saturated vegetable oil, the balance of said blend being an unrearranged vegetable oil having natural linoleic acid in glyceridic ester form in which the ratio of $$\frac{\text{Linoleic acid}+\text{polyunsaturated acid of the linoleic series}}{\text{Oleic acid}+\text{monounsaturated acids}}$$

is at least about 2, said confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to about 60, at 80° F. of from about 30 to about 50, and at 92° F. of from about 5 to about 25, and having a ratio of linoleic acid to saturated acids of from about 0.02 to about 0.2.

8. A nutritious confectioners' fat consisting essentially of a fat blend comprising at least about 80% of an interesterified fat which comprises about 55% to about 90% of a tropic fat having an iodine value of less than about 15 and a melting point of less than about 115° F. and containing substantially no linoleic acid and about 10% to about 25% of a saturated vegetable oil, the balance of said blend being a separately rearranged vegetable oil having natural linoleic acid in glyceridic ester form in which the ratio of $$\frac{\text{Linoleic acid}+\text{polyunsaturated acid of the linoleic series}}{\text{Oleic acid}+\text{monounsaturated acids}}$$

is at least about 2, said confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to about 60, at 80° F. of from about 30 to about 50, and at 92° F. of from about 5 to about 25, and having a ratio of linoleic acid to saturated acids of from about 0.02 to about 0.2.

9. A nutritious confectioners' fat according to claim 8 wherein said tropic fat is selected from the group consisting of coconut oil, babassu oil, palm kernel oil and cohune nut oil, wherein said saturated vegetable oil is selected from the group consisting of saturated domestic oils selected from the group consisting of saturated cottonseed oil, saturated cottonseed stearine, saturated soybean oil, saturated peanut oil, saturated corn oil and saturated safflower oil and wherein the vegetable oil is selected from the group consisting of corn oil, cottonseed oil, soybean oil, cottonseed stearine and safflower oil.

10. A process of preparing a nutritious confectioners' fat comprising interesterifying a fat blend consisting essentially of at least about 55% of a tropic fat having iodine value of less than about 15, a melting point of less than about 115° F. and containing substantially no linoleic acid and at least about 10% of a saturated vegetable oil, and blending at least about 80% of said interesterified fat with an unrearranged vegetable oil having natural linoleic acid in glyceridic ester form in which the ratio of $$\frac{\text{Linoleic acid} + \text{polyunsaturated acid of the linoleic series}}{\text{Oleic acid} + \text{monounsaturated acids}}$$

is at least about 2 thereby producing a confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to about 60, at 80° F. of from about 30 to about 50, and at 92° F. of from about 5 to about 25, and having a ratio of linoleic acid to saturated acids of from about 0.02 to about 0.2.

11. A process of preparing a nutritious confectioners' fat comprising interesterifying a fat blend consisting essentially of about 55% to about 90% of a tropic fat having an iodine value of less than about 15, a melting point of less than about 115° F. and containing substantially no linoleic acid with about 10% to about 25% of a saturated vegetable oil, separately rearranging a vegetable oil having natural linoleic acid in glyceridic ester form in which the ratio of $$\frac{\text{Linoleic acid} + \text{polyunsaturated acid of the linoleic series}}{\text{Oleic acid} + \text{monounsaturated acids}}$$

is at least about 2, blending at least about 80% of said interesterified tropic fat and saturated vegetable oil blend with said separately rearranged vegetable oil to produce a confectioners' fat containing about 2 to 15% of natural linoleic acid and having a melting point of from about 90° F. to about 115° F., an iodine value of from about 4 to about 32, S.C.I. values at 50° F. of from about 50 to about 70, at 70° F. of from about 40 to about 60, at 80° F. of from about 30 to about 50, and at 92° F. of from about 5 to about 25, and having a ratio of linoleic acid to saturated acids of from about 0.02 to about 0.2.

12. A process according to claim 11 wherein said tropic oil is selected from the group consisting of coconut oil, babassu oil, palm kernel oil and cohune nut oil, wherein said saturated fat is selected from the group consisting of saturated corn oil, saturated cottonseed oil, saturated soybean oil, saturated peanut oil, saturated cottonseed stearine and saturated safflower oil and wherein said vegetable oil is selected from the group consisting of corn oil, cottonseed oil, soybean oil, cottonseed stearine and safflower oil.

References Cited in the file of this patent

UNITED STATES PATENTS

| | | |
|---|---|---|
| 2,859,119 | Cochrane et al. | Nov. 14, 1958 |
| 2,890,959 | Phillips | June 16, 1959 |
| 2,921,855 | Melnick et al. | Jan. 19, 1960 |

UNITED STATES PATENT OFFICE
CERTIFICATE OF CORRECTION

Patent No. 3,133,819 May 19, 1964

Chester M. Gooding

It is hereby certified that error appears in the above numbered patent requiring correction and that the said Letters Patent should read as corrected below.

Column 4, between lines 29 and 30, insert as a heading -- Example 3 --, in italics; line 31, for "interesteified" read -- interesterified --; column 5, line 29, before "60" insert -- about --; line 35, before "tropic" insert -- a --; line 48, before "70" insert -- about --; line 51, for "unsaturated" read -- saturated --.

Signed and sealed this 22nd day of September 1964.

(SEAL)
Attest:

ERNEST W. SWIDER
Attesting Officer

EDWARD J. BRENNER
Commissioner of Patents